United States Patent Office 3,017,303
Patented Jan. 16, 1962

3,017,303
ADHESIVE COMPOSITION CONTAINING LIGNO-
CELLULOSE AND EXTRACTED LIGNIN AND
PLYWOOD LAMINATE THEREOF
Joseph W. Ayers, Easton, Pa., assignor to Agrashell, Inc.,
Los Angeles, Calif., a corporation of Delaware
No Drawing. Filed Apr. 22, 1954, Ser. No. 425,051
17 Claims. (Cl. 154—45.9)

This invention relates to certain novel lignocellulosic-lignin compositions for adding to and improving the quality of synthetic resin plywood and laminating glues and also to adhesive compositions containing the same.

Uniform particle size walnut shell flour has been used as an extender for synthetic resin glues for several years and the resulting adhesive compositions have been uniquely successful in the production of superior exterior grade plywood. Whereas these glues have been quite satisfactory for the production of high quality bonds on average core and veneer stocks, the plywood industry is now faced with a rapidly decreasing quality of veneer stock. When attempts have been made to use these glues on low quality or "fringe" veneer stocks, satisfactory performance was not obtained due to (1) lack of penetration and bond to hard knots, sap lines and end-grain veneers, (2) excessive penetration of the soft, porous summer growth wood, and (3) poor transfer from spreader rolls to dry core veneers because of low degree of tack and low glue viscosity.

It is an object of the present invention to provide extender compositions which when added to synthetic resin glues of the character used in the plywood industry, will provide adhesive compositions specially adjusted for such purposes having properties overcoming the foregoing deficiencies such that improved commercially acceptable plywood and laminates for exterior as well as interior use can be obtained from lower quality stocks as well as high grade stocks.

Attempts have been made to solve the foregoing problems by providing extenders composed of alkali degraded bark or other vegetable shell materials but the usefulness of these modified extenders is limited, for they either require hot processing and/or their properties vary widely from batch to batch depending on a number of factors beyond the producers' control.

Another object is to provide synthetic resin adhesives for plywood manufacture which contain larger proportions of inexpensive extender materials and water, without sacrifice in performance, whereby glue costs can be substantially reduced.

The invention may be considered to reside, firstly, in new extender compositions composed wholly or primarily of a combination of finely divided naturally occurring lignocellulose extenders analyzing from 40 to 65% cellulose and 5 to 50% lignin content, together with finely divided extracted lignin obtainable from any one of a number of possible sources. These extender compositions are particularly designed for sale to and use by fabricators of plywood and laminates of similar requirements, but they can be employed in adhesive compositions used in veneering, in other laminating operations and in assembly work.

Secondly, invention of an equal or even greater order extends to the adhesive compositions produced by the incorporation of these extender composition in synthetic resin glue solutions of the type used in the plywood industry, for such adhesive compositions have outstanding unique working properties and lead to plywood and similar laminates having superior bonds.

The preferred lignin component of the compositions of the invention is referred to as an "alkali lignin," for it is produced as a by-product from wood pulping processes employing alkali, the most common procedure being known as the Kraft process. The by-product liquid extracted from the pulped mass is purified and concentrated by various companies to provide a series of lignin products including separated or freed lignin, and sodium lignate. These products are usually reduced to a powder and sold in this condition.

In the practice of the present invention it is preferred that substantially purified lignin products be employed, for not only are superior ultimate results obtainable but greater uniformity of working properties of the adhesives follow. The most satisfactory material for incorporation with the extenders is the substantially purified lignin itself or lignin from which the cellulose and soluble products are substantially removed to provide a consistently uniform product. Since synthetic resin glues or adhesive compositions as now produced are alkaline in character and such condition is ordinarily to be retained in the adhesive compositions of the present invention, the utilization of the extender compositions containing substantially purified or free lignin in such glue compositions leads to redissolution of the lignin and the formation of alkali or sodium lignate. Very little alkali is required to dissolve the free lignin and hence caustic alkali need be added to the glue composition only if required for the other purposes hereinafter described. If sodium lignate is used instead of free lignin, then of course none of the alkali present in the glue or added to the mix, is taken up by the lignin.

The lignin component of applicants composition is referred to as being "extracted," for it is a product which has been separated from the wood or other lignocellulose material from which it has been derived by chemical or other action. Only through the use of lignin in extracted form can the quality and the preformance of the adhesive compositions of the invention be attained and maintained. To produce commercially acceptable results, experience has shown that it is essential that not only must the lignocellulose flour be of known constitution and uniform character, but also the lignin component must be of a definite and known quality.

Less satisfactorily, the extracted lignin may be a product derived from lignocellulosic materials by biological action (as the butt rot of trees) or be selective solvent action using ether, alcohol and other solvents, examples of such products being described in the literature. These extracted lignins are soluble in alkali at ambient temperatures or at the normal room temperatures at which they are used in the formulation of the adhesives of the present invention.

As hereinbefore indicated, the extender components of the compositions of the present invention are naturally-occurring, ligno-cellulosic materials composed of 40 to 65% cellulose and 5 to 50% lignin. The ligno-cellulosic materials within these analysis limits are for the most part vegetable shell materials including nut shells, endocarps of drupes and grain hulls. Among these extenders there may be mentioned by way of example the shells of nuts such as walnut (both English and black), hickory, palm and filbert; the pit shells of fruits such as peach, plum and apricot, the hulls of grains and seeds such as oat hulls and the cones or strobiles of coniferous trees. Even wood flour of the indicated constitution can be used to advantage in special adhesive compositions of limited utility. The products are referred to as "naturally occurring" to distinguish from cellulose-degraded or lignin-modified lignocellulosic materials resulting from alkali, acid or other severe treatment of lignocellulosic products. These degraded materials are less uniform and appear to be otherwise less suitable than the natural materials for the production of high quality adhesives and plywood. It should be understood, however, that minor amounts of alkali-degraded lignocellulose material and other substantially modified vegetable materials or agricultural wastes can be employed in admixture with naturally-occurring, lignocellulosic materials of the hereinbefore described character with acceptable results.

Superficially treated or substantially unaltered naturally-occurring, lignocellulosic materials such as those described in the Ayers Patent No. 2,507,465 can with varying degrees of success be employed in the practice of the present invention and hence are not excluded by the terms used herein for defining the extender component. In this patent, it is disclosed that natural organic fillers used in industrial products have been below 100 mesh for the most part, and that the fillers produced by the patented process are ground to a product of quite fine particle size, e.g. most, or at least 90%, through a 325 mesh screen when English walnut shells are treated and ground to provide adhesive extenders for plywood production.

The extender-lignin compositions of the present invention are used most effectively in combination with phenolic-aldehyde resin glues which are employed extensively in the production of exterior grade plywood. Most commonly, such products constitute alkaline colloidal solutions or aqueous emulsions having from about 40 to 50% resin solids. The resins most generally used in glue compositions and preferred in the present compositions are those resulting from the reaction of alkali catalyzed solutions of phenol and formaldehyde having a pH from about 9.5 to 13. It is also contemplated that phenol-aldehyde resins as are obtained by the reaction of cresol or other substituted phenols with formaldehyde and other aldehydes such as acetaldehyde and paraformaldehyde be used.

A suitable phenolic resin may be produced for example, by reacting 1 mol of phenol with 2 mols of formaldehyde in the presence of sodium hydroxide in an amount of about 3% based on the weight of the phenol, the reaction being carried out at 85 to 100° C. until the proper viscosity is obtained, after which the resulting reaction solution is diluted with an aqueous solution to yield a product of about 50% solids, this product being compatible with water and convertible into a hard insoluble product when heated to a temperature above 100° C.

Highly satisfactory and improved results are also obtained when the extender-lignin compositions of the invention are employed with amino-aldehyde glues, and in particular urea-formaldehyde glues, which glues, to a large extent, are employed in the production of plywood of interior grade. The adhesive compositions of the present invention containing the urea-formaldehyde glue have the most surprising capacity for producing plywood meeting the standard qualifications of exterior grade products.

A urea-formaldehyde resin suitable for use as a plywood adhesive may be produced by heating together 60 parts of urea, 160 parts of formalin (37%), 2 parts of ammonium hydroxide (28%) and 1 part of sodium acetate at 90° C. for two hours. If the pH at the end of the reaction is lower than 7.0, more ammonium hydroxide is added. A vacuum of 22–28 inches of mercury is applied to distill off the water, at 60° C., to obtain a viscosity (Gardner tubes) of W–Z. The mass is then cooled to 30° C., and ammonium hydroxide is added to adjust the solution to a pH of 7.5.

Other synthetic resin glues with which the compositions of the invention may be employed include melamine-formaldehyde glues, resorcinol-aldehyde glues, and protein glues, as those prepared from blood or albumin, and also those from soybeans.

The synthetic resin glues preferably employed are those sold in the form of colloidal solutions or emulsion, but true aqueous solutions and organic solutions (as alcoholic) of the resins can also be employed.

In producing the glue adhesives of the present invention the amount of lignin employed in relation to the amount of the lignocellulosic extender is dependent on the chemical composition and physical properties of the lignocellulosic material used, but the optimum amount required to produce the most satisfactory properties in the adhesive composition does not vary much from 15% lignin. For most purposes from 10 to 20% lignin produces highly satisfactory results but substantial advantages can be obtained by using from 5 to 50% lignin in the lignin-extender compositions. The amount of lignin employed affects the tack and viscosity of the adhesive compositions and the stability of the glue bond. If insufficient lignin is employed the adhesive compositions lack tack, are deficient in roll transfer to veneer and show an insufficient degree of penetration into the wood. On the other hand if too great an amount of lignin is employed too much penetration results and produces a thin, low strength glue bond. Also excessive lignin causes a high degree of tack resulting in poor spreading qualities. The optimum proportions under any specific operation can be determined by conventional tests.

In producing the adhesive compositions of the present invention utilizing the lignin-containing extender compositions, conventional ratios of resin to extender composition to water can be employed. With conventional phenolic resin glue aqueous emulsions (about 40–50% solids), the weight ratio of resin to extender to water, for highest quality, is 5/1/1.75. In the practice of the present invention it has been discovered that, through the addition of the lignin, larger proportions of extender and water can be employed with the various glues in the adhesive compositions with quite satisfactory results. The ratio of extender and water can be greatly increased to provide compositions having the ratios of 5/2/4 or even 5/2.5/5. Ratios of 5/1.2–2.8/1.8–5.5 are all economically advantageous. The quality of the bond will depend, not only on the adhesive composition, but also on other factors such as assembly time, press temperature, pressure and curing time.

For exterior grade plywood production using commercial phenolic-aldehyde glues, the extender composition and water can be present in maximum amounts in ratios expressed as 5/2/4. For interior grade plywood production using such glues, the satisfactory ratios may rise to 5/4/7 dependent on the intended use to which the plywoods are to be put.

In producing these higher ratio adhesive compositions, it is ordinarily necessary to employ lignin-extender compositions in which the extracted lignin amounts to 15% or more of the lignin-extender composition. Also it has been discovered that in utilizing these highly filled glues, the percent moisture of the veneer and cores should not exceed about 8% for satisfactory results. Surprisingly also superior bonds are obtainable when the alkalinity of the adhesive composition is below that normally considered necessary for satisfactory bonding.

When the proportion of extracted lignin in the extender composition is from about 10 to 15%, the alkali in the glue solution used may be sufficient, and no addition of caustic alkali may be required. The quality or structure of the wood to be bonded with the adhesive composition containing this amount of lignin determines the necessity for and amount to be added. However, when the proportion of lignin is high, as at about 30% or more and is sufficiently high to affect adversely the viscosity of the adhesive composition, caustic alkali may be required in an amount of 5% or more (in relation to the extender-lignin content) to reduce the viscosity to a satisfactory level, from 15 to 20% appearing to be the maximum permissible amount. The nature of the wood to be bonded may effect the amount of lignin as well as the amount of alkali to be used, if optimum strength is desired.

These highly loaded adhesive compositions are satisfactory for the production of good quality exterior plywoods and they are as well eminently suitable for the production of high quality interior building plywoods.

The lignin-extender compositions of the present invention may be prepared simply by mixing finely divided dry lignocellulose extender with dry powdered lignin or sodium lignate. For producing the adhesives from this composition, the preferred procedure involves adding to the dry composition an aqueous alkaline solution, either hot or cold, in an amount which provides the amount of water required and the amount of alkali required to produce the desired alkalinity in the glue composition. The mixing can be accomplished at normal room temperatures with available tap water (10–40° C.) although water at higher temperature (80–200° C.) may be used if available, and after a homogeneous mass is obtained, the synthetic resin glue is added and stirred until a homogeneous mass is again obtained.

The invention is exemplified by the compositions and products defined in the following table:

using a two-roll spreader at spreading rates of 46–58 pounds per thousand square feet. Thereupon plywood was formed on three ply 5/16 inch or on five ply 13/16 inch thickness veneer at intervals of from 2 to 20 minutes. In some instances assembly times were extended to thirty minutes. Finally the three ply panels were pressed at 285° F. under a pressure of 200 pounds per square inch for a period of three minutes for single panel assemblies and for 8½ minutes for double panel assemblies. The resulting panels were post cured at 180–200° F. for five hours and then subjected to the standard DFPA exterior boil tests. Results are represented as percent wood failure.

In a special and important embodiment of the invention whereby uniquely high grade polywood bonds are obtained, the phenolic-aldehyde adhesive compositions used with the novel extender-lignin compositions herein described are supplemented by the addition of a polyepoxide resin containing free epoxy groups.

The epoxy resin is most easily and effectively introduced into the composition with the lignocellulose extender-lignin compositions herein described. The extender in comminuted form is preferably first coated with the epoxy resin and then the resulting mass is mixed with the extracted lignin in the manner hereinbefore described.

The coating may be carried out in any desired way or simply by introducing ground cellulosic materials, as walnut shell flour, into a ball mill with the desired percentage (ordinarily 2–5% by weight) of liquid epoxy resin as sold commercially, premixing until the resin is taken up by the lignocellulosic material, next adding the balls and turning for an additional period, as for fifteen minutes. The epoxy resin spreads throughout the mass and uniformly coats the particles of the lignocellulosic material.

[Parts/weight]

| | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| Extender composition: | | | | | | | | | | | | | | | | | | | | | |
| Walnut shell flour | 85 | 85 | 85 | 90 | 85 | 80 | 75 | 50 | 85 | 75 | 50 | 120 | 119 | 119 | 119 | 119 | 119 | 112 | 85 | 85 | 80 |
| Lignin-1 [1] | 15 | | | 10 | 15 | 20 | 25 | 50 | 15 | 25 | 50 | 30 | 21 | 21 | 21 | 21 | 21 | 28 | 15 | 15 | 20 |
| Lignin-2 [2] | | 15 | | | | | | | | | | | | | | | | | | | |
| Lignin-3 [3] | | | 15 | | | | | | | | | | | | | | | | | | |
| Sodium hydroxide | 20 | 20 | 20 | 20 | 20 | 20 | 20 | 20 | 20 | 20 | 20 | 20 | 20 | 20 | 20 | 14 | 28 | 20 | | | |
| Sodium carbonate | 25 | 25 | 25 | 25 | 25 | 25 | 25 | 25 | 25 | 25 | 25 | 25 | 25 | 25 | 25 | 17.5 | 35 | 25 | | | |
| Phenolic resin A [4] | 500 | 500 | 500 | | | | | | | | | | | | | | | | | | |
| Phenolic resin B [5] | | | | 500 | 500 | 500 | 500 | 500 | | | | 300 | 350 | | | 350 | 350 | 350 | | | |
| Phenolic resin C [6] | | | | | | | | | 500 | 500 | 500 | | | | | | | | | | |
| Phenolic resin D [7] | | | | | | | | | | | | | | 350 | | | | | | | |
| Phenolic resin E [8] | | | | | | | | | | | | | | | 350 | | | | | | |
| Amine resin [9] | | | | | | | | | | | | | | | | | | | 500 | 500 | 500 |
| Water | 175 | 175 | 175 | 175 | 175 | 175 | 175 | 175 | 175 | 175 | 175 | 300 | 280 | 280 | 280 | 280 | 280 | 280 | 100 | 175 | 175 |
| Viscosity—fresh [10] | 67 | 69 | 68 | 72 | 73 | 75 | 77 | 96 | 79 | 81 | 94 | 70 | 70 | 90 | 66 | 66 | 71 | 68 | 94 | 70 | 71 |
| Viscosity—18 hrs | 87 | 78 | 70 | 82 | 80 | 81 | 85 | 116 | 86 | 91 | 115 | 82 | 75 | 115 | 69 | 70 | 81 | 70 | 106 | 71 | 69 |
| Percent W.F.—Boil:[11] | | | | | | | | | | | | | | | | | | | | | |
| A.T. 2 min | | | | 85 | 91 | 80 | 82 | 76 | 96 | 89 | 93 | 87 | 88 | 90 | 88 | 87 | 87 | 91 | | | |
| A.T. 5 min | 92 | 85 | 83 | | | | | | | | | | | | | | | | | | |
| A.T. 10 min | | | | 96 | 94 | 87 | 79 | 25 | 87 | 90 | 91 | 88 | 95 | 82 | 88 | 91 | 81 | 96 | | | |
| A.T. 15 min | 92 | 92 | 83 | | | | | | | | | | | | | | | | | | |
| A.T. 20 min | 92 | 92 | 88 | 90 | 90 | 85 | 72 | 78 | 92 | 86 | 86 | 87 | 81 | 88 | 88 | 85 | 81 | 90 | | | |
| A.T. 30 min | 90 | 95 | 88 | | | | | | | | | | | | | | | | | | |
| Percent W.F.—Soak [12] | | | | | | | | | | | | 80 | 88 | 92 | 88 | 95 | 87 | 93 | | | |

| | | | | | | | | | | | | | | | | | | | A [14] | B [15] | A | B | A | B |
|---|---|---|---|---|---|---|---|---|---|---|---|---|---|---|---|---|---|---|---|---|---|---|---|---|
| A.T. 2 min | | | | | | | | | | | | | | | | | | | 92 | 87 | 95 | 87 | 84 | 82 |
| A.T. 10 min | | | | | | | | | | | | | | | | | | | 90 | 92 | 97 | 85 | 95 | 85 |
| A.T. 20 min | | | | | | | | | | | | | | | | | | | 87 | 92 | 90 | 92 | 87 | 85 |
| Delamination [16] | | | | | | | | | | | | | | | | | | | | No | | No | | No |
| Ratio [13] | | | | 5/1/1.75 | | | | | | | | 5/2.5/5 | | | | 5/2/4 | | | 5/1/1 | | 5/1/1.75 | | 5/1/1.75 | |

[1] Purified pine wood lignin powder.
[2] Purified sodium lignate powder.
[3] Crude sodium lignate powder.
[4] Viscosity G. Solids Content, 40.8%.
[5] Viscosity J. Solids Content, 40.0%.
[6] Viscosity K. Solids Content, 40.0%.
[7] Solids content 40%.
[8] Solids content 50%.
[9] Commercial urea-formaldehyde aqueous glue solution Solids content 64%.
[10] Viscosity, Krebs Units, K.U.
[11] Average % wood failures, standard D.F.P.A. exterior boil test. A.T.=assembly time.
[12] Average % W.F., all assemblies, exterior soak test.
[13] Commercial glue solution/extender comp./water.
[14] Exterior Soak tests following interior soak tests.
[15] Interior Soak Tests.
[16] 10 cycles-std. CS45-48, D.F.P.A.

The procedure for making the adhesive compositions described in the above table was the same in all cases. The lignocellulose flour and the lignin component were blended by dry mixing at room temperature for two minutes. The alkaline solution was then added to this dry mixture and mixing was continued for twenty minutes. Thereupon the resin glue solution or emulsion of the conventional commercial type indicated was added and the mixing continued for an additional five minutes. This procedure has been simple and efficient, although other systems of mixing and additions of ingredients have been satisfactory. Variation of the procedure will depend on the type of mixing equipment.

In producing the plywood using the adhesive compositions, such compositions were spread on 1/10 to 3/16 inch thickness Douglas fir wood cores (2.5–7% moisture) by The amount of epoxy resin mixed with or coated upon the lignocellulosic material depends upon many factors and amounts up to thirty percent of the extender can be employed but for most purposes, from about 1% to 5%, is sufficient.

The epoxy resin employed in this embodiment of the invention is exemplified by the monomeric glycidyl polyethers of polyhydric phenols, such as 2,2-bis (4-glycidyl oxyphenol) propane and their polymers. The epoxy resin component may be any of the available ethoxylin or polyepoxide resin products now sold on the market for use in producing hard resin products. The resins contemplated may have any molecular weight and epoxy equivalent so long as free epoxy groups are available for reaction with the cellulose extender or reaction with a phenolformaldehyde resin if present and possibly also with other components of glue compositions herein described.

Epoxy resins have been described in published material as being produced by reacting polyhydroxy hydrocarbons including phenols of the nature of resorcinol, glycerin, bis-phenols such as bis-phenol A and diphenylolpropane with epichlorohydrin or with dichlorohydrin in the presence of an inorganic or organic base in aqueous or alkaline solution preferably during heating. As a result of the reaction there is formed a thermosetting resin which may thereafter be subsequently polymerized by the action of heat, an acid, alkaline or amine catalyst.

Other examples of epoxy resins contemplated are those resulting from the reaction of alcohols, including glycerol, pentaerythritol, trimethylol propane, sorbitol, glycol and the like with a chlorohydrin, i.e., epichlorohydrin or dichlorohydrin. There may be mentioned also those resulting from polyallyl alcohol-epichlorhydrin, paraphenyl (phenol) epichlorhydrin; dimethylol phenols (such as dimethylol para-cresol, or dimethylol tertiary butyl or amyl phenols) epichlorhydrin, and glycerol-epichlorohydrin diglycidyl ether. Finally, dimethylol phenols formed by alkaline condensation with formaldehyde provide operable resins with epichlorohydrin (glycol mono-chlorhydrin).

The epoxy compounds of one type and preferred in the present invention may be referred to as aromatic diglycidyl ethers resulting from the reaction of epichlorohydrin and 2,2 bis (parahydroxyphenol) propane, in aqueous alkaline media such as sodium hydroxide. This product (hereinafter called "epoxy resin A") is relatively free of poly condensation products and is predominantly composed of monomeric molecules.

Condensation products of such compounds are also contemplated as for example, the glycerol diaryldiglyidyl ether.

The diglycidyl ether may be prepared for example by reacting 1 mol of 2,2-bis(parahydroxyphenol) propane with 4 mols of epichhlorohydrin by heating the mixture in an atmosphere of nitrogen at a temperature of from 105 to 110° C. for a period of 16 hours during which 2 mols of sodium hydroxide in 30% aqueous solution are added dropwise. The excess of epichlorohydrin is continuously removed with the water of reaction as an azeotropic mixture. The compound is washed with water to remove the sodium chloride formed as a by-product of the reaction. The resulting diglycidyl ether has a molecular weight of about 350, an epoxide equivalent of 200 and a viscosity (Gardner tubes) of $Z_5$–$Z_6$.

The condensation products may be prepared in accordance with the above procedure but the mol ratio of epichlorohydrin to the bis compound is lower than 4 to 1 and of the order of 3 to 1. These ethers contain a glycerol hydroxy group and are higher molecular weight condensation products having for example, a molecular weight of about 450 and an epoxide equivalent of from about 225 to 290 and a melting point of about 20 to 28° F.

The highly effective performance of adhesives containing the epoxy resin-coated extender together with extracted lignin is illustrated in the following example:

An adhesive composition was compounded by mixing the following components, in parts by weight, by the procedure hereinbefore described:

Walnut shell flour containing 2% epoxy resin (epoxy resin A) _____ 85
Alkali extracted lignin _____ 15
NaOH _____ 10
$Na_2CO_3$ _____ 10
Water _____ 175
Phenolic resin,[1] visc. K, 40% solids_____ 500

[1] Adhesive solution (aqueous).

Upon testing the resulting adhesive composition in plywood production by the procedure hereinbefore disclosed, cured specimens showed in the exterior boil tests very uniform shear strengths averaging 220 and wood failures averaging 97%. All wood failure tests were 90% or better.

In a less desirable variation of the foregoing embodiment, the epoxy resin may be added directly to the phenolicaldehyde resin aqueous alkaline solution (a true solution or a colloidal solution), either before or after the addition of lignocellulose-lignin extender, and the water or other ingredients to be included in the adhesive composition. The epoxy resin disperses readily in this aqueous medium.

The proportions of the two resins used in the adhesive compositions in this phase of the invention may be varied within wide limits but one of the features of this embodiment is that phenolic resin glues and the plywood produced therefrom may be greatly improved by the addition of only a minor amount or a very small percentage of the epoxy resin. Improved results can be obtained when as little as .4 of 1% epoxy resin, by weight, is used in relation to the amount of phenolic resin solid employed. For very high quality plywood at economically feasible cost, the epoxy resin may amount to as much as 12%. If economy is not a consideration, the epoxy resin may be increased in amount up to the quantity of the phenolic resin used.

The advantages of the extender compositions and of the adhesive compositions containing the same may be summarized as follows:

Plywood adhesives of highly desirable properties extended with vegetable shell materials are provided which can be successfully used with low quality veneer stocks as well as with high grade veneer stocks.

Adhesive compositions having more effective penetration leading to superior bonds are provided, the increased strength being due in part to the fact that in the hardening of the glue bond, the sodium lignate is converted to lignin which is itself an adhesive.

Adhesive compositions are provided which do not excessively penetrate into soft, porous summer growth wood.

An extender composition is provided which is capable of imparting increased viscosity to adhesive compositions, the increase being in proportion to the amount used. Thus better control of viscosity is obtainable.

The extender compositions impart higher degree of tack to the adhesive compositions.

The presence of the lignin in the extender composition brings about more satisfactory dispersion qualities when the extender composition is mixed with the resin glue.

The proportion of extender and water in relation to the resin can be very substantially increased without loss of working properties or quality of the bond obtained, thus substantially reducing the glue cost and also the plywood production cost.

Plywood of exterior grade can be produced with urea-aldehyde glues which heretofore have been satisfactory for the production of plywood of interior grade only.

The adhesive compositions have high stability and change very little in viscosity and other properties in the glue machine.

The rate of spread in the machine can be varied or controlled simply by mechanical adjustment.

High viscosity resin solutions may be used to provide highly viscous glues which are stable to viscosity changes over long periods. This desired effect is due to the dispersing properties of the extender compositions. They also have the capacity for taking up much water.

It should be understood that the invention is not limited to the specific details herein given but that it extends to all equivalents which will occur to those skilled in the art upon consideration of the scope of the claims appended hereto.

I claim:

1. Plywood- and laminating-adhesive compositions which comprise a glue solution containing therein a mixture of 95–50% of a finely divided naturally-occurring lignocellulose extender composed of from 40–65% cellulose and 5–50% lignin, and 5–50% of an alkali-solubilized extracted lignin, said glue being selected from the group consisting of phenolic-aldehyde resin glues, amine-aldehyde resin glues and protein glues.

2. Plywood- and laminating-adhesive compositions which comprise a glue solution containing therein a mixture of 95–50% of a finely divided naturally-occurring lignocellulose extender composed of from 40–65% cellulose and 5–50% lignin, and 5–50% of a substantially purified extracted lignin together with alkali in a quantity which dissolves the lignin, said glue being selected from the group consisting of phenolic-aldehyde resin glues, amine-aldehyde resin glues and protein glues.

3. Plywood- and laminating-adhesive compositions which comprise a glue solution containing therein a mixture of 95–50% of a finely divided naturally-occuring lignocellulose extender composed of from 40–65% cellulose and 5–50% lignin, and 5–50% of sodium lignate, said glue being selected from the group consisting of phenolic-aldehyde resin glues, amine-aldehyde resin glues and protein glues.

4. Plywood bonded by an adhesive composition comprising a glue containing therein a mixture of 90–70% of a finely divided naturally-occurring lignocellulose extender composed of from 40–65% cellulose and 5–50% lignin, and 10–30% of extracted lignin, in relation to the weight of the extender, said glue being selected from the group consisting of phenolic-aldehyde resin glues, amine-aldehyde resin glues and protein glues.

5. Plywood- and laminating-adhesive compositions which comprise a phenolic-aldehyde resin glue aqueous solution containing therein a mixture of 95–50% of a finely divided naturally-occurring lignocellulose extender composed of from 40–65% cellulose and 5–50% lignin, and 5–50% of an alkali-solubilized extracted lignin.

6. Plywood- and laminating-adhesive compositions which comprise a phenolic-aldehyde resin emulsion containing therein a finely divided naturally-occurring lignocellulose extender composed of from 40–65% cellulose and 5–50% lignin, and an addition of an alkali-solubilized extracted lignin and the ratio of the lignin to the extender being from 15–50 of the former to 85–50 of the latter, and the ratio of the glue solution of about 40–50% solids content to the extender-lignin components to the water being within the range of 5/1.2–4/1.80–7.

7. Plywood- and laminating-adhesive compositions which comprise an amino-aldehyde resin glue solution containing therein a mixture of 95–50 of vegetable shell flour and 5–50% of an extracted lignin dissolved in said solution.

8. Plywood- and laminating-adhesive compositions which comprise an amino-aldehyde resin glue aqueous solution containing therein a mixture of 95–50% of a finely divided naturally-occurring lignocellulose extender composed of from 40–65% cellulose and 5–50% lignin, and 5–50% of a substantially purified, extracted lignin derived from alkali lignin.

9. Plywood-adhesive compositions for the production of exterior and interior grade plywoods which comprise a urea-aldehyde resin glue aqueous solution containing therein a mixture of 95–50% of a naturally-occurring vegetable shell flour extender, and 5–50% of a substantially purified, extracted lignin derived from alkali lignin.

10. Plywood- and laminating-adhesive compositions which comprise a glue solution containing therein a mixture of 95–50% of nut shell flour and 5–50% of a substantially purified, extracted lignin derived from a kraft paper pulping process, said glue being selected from the group consisting of phenolic-aldehyde resin glues, amine-aldehyde resin glues and protein glues.

11. A process for improving the quality of plywood- and laminating-adhesive compositions which comprises adding to the glue solution a mixture of 95–50% of a finely divided naturally-occurring lignocellulose extender composed of from 40–65% cellulose and 5–50% lignin, and 5–50% of an alkali-solubilized extracted lignin, said glue being selected from the group consisting of phenolic-aldehyde resin glues, amine-aldehyde resin glues and protein glues.

12. A process for improving the quality of plywood- and laminating-adhesive compositions which comprises adding to a thermosetting phenolic-aldehydic resin glue solution a mixture of 95–50% of nut shell flour and 5–50% of an alkali-solubilized lignin extracted by a kraft paper pulping process.

13. A composition of matter for adding to and improving the working and bonding qualities of synthetic resin adhesive compositions for manufacture of plywood and other laminated products consisting essentially of a mixture of 95–50% of a finely divided naturally-occurring lignocellulose extender composed of from 40–65% cellulose and 5–50% lignin, the particles of which are coated with an epoxy resin containing free epoxy groups, and 5–50% of a finely divided extracted lignin, said epoxy resin being derived by the reaction of a polyhydroxy hydrocarbon with a compound selected from the group consisting of epichlorohydrin and dichlorohydrin.

14. Plywood- and laminating-adhesive compositions containing a phenolic-aldehyde resin glue in aqueous alkaline solution containing therein a lesser amount of an epoxy resin containing free epoxide groups, a finely divided naturally-occurring lignocellulose extender composed of from 40–65% cellulose and 5–50% lignin, and an addition of an extracted lignin, said epoxy resin being derived by the reaction of a polyhydroxy hydrocarbon with a compound selected from the group consisting of epichlorohydrin and dichlorohydrin.

15. A plywood- and laminating-adhesive composition which comprises a phenolic-aldehyde resin glue aqueous solution containing therein a mixture of 95–50% of a finely divided naturally-occurring lignocellulose extender composed of from 40–65% cellulose and 5–50% lignin, and 5–50% of an extracted lignin, in an alkali solubilized condition, and caustic alkali in an amount not more than about 20% of the extender-lignin content present in the composition.

16. Plywood- and laminating-adhesive compositions which comprise a phenolic-aldehyde resin glue aqueous solution containing therein a mixture of 95–50% of a finely divided naturally-occurring lignocellulose extender composed of from 40–65% cellulose and 5–50% lignin, 5–50% of an extracted lignin in an amount up to 50% of the amount of the extender present, and caustic alkali, the amount of lignin present being such as would create in the adhesive composition in the absence of added alkali a viscosity in excess of that permitted for application by the roll spreaders used in plywood manufacture, and the amount of added alkali being that which provides the viscosity required for such purpose.

17. Exterior grade plywood the layers of which are bonded together by an adhesive composition comprising an amino-aldehydic resin glue containing therein a mixture of 90–70% of a finely divided lignocellulosic extender composed of about 40–65% cellulose and 5–50% lignin, and an addition of about 10–30% extracted sodium lignate.

References Cited in the file of this patent

UNITED STATES PATENTS

| | | |
|---|---|---|
| Re. 23,347 | Redfern | Mar. 20, 1951 |
| 2,161,748 | Samaras et al. | June 6, 1939 |
| 2,357,090 | D'Alelio | Aug. 29, 1944 |
| 2,404,840 | Harvey | July 30, 1946 |
| 2,430,736 | Redfern | Nov. 11, 1947 |
| 2,507,465 | Ayers | May 9, 1950 |
| 2,669,522 | Othmer et al. | Feb. 16, 1954 |
| 2,682,515 | Naps | June 29, 1954 |